United States Patent [19]

Shepard

[11] Patent Number: 5,852,685

[45] Date of Patent: *Dec. 22, 1998

[54] ENHANCED BATCHED CHARACTER IMAGE PROCESSING

[75] Inventor: David H. Shepard, Coronado, Calif.

[73] Assignee: Cognitronics Imaging Systems, Inc., San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 558,830

[22] Filed: Nov. 15, 1995

Related U.S. Application Data

[63] Continuation-in-part of Ser. No. 097,131, Jul. 26, 1993, Pat. No. 5,526,447.

[51] Int. Cl.⁶ .............................. G06K 9/03; G06K 9/62
[52] U.S. Cl. ........................ 382/311; 382/209; 382/309; 382/310
[58] Field of Search .................................. 382/209, 219, 382/221, 310, 213, 218, 309, 311, 187

[56] References Cited

U.S. PATENT DOCUMENTS

| | | | |
|---|---|---|---|
| 3,013,718 | 12/1961 | Shepard | 235/61.7 |
| 3,303,463 | 2/1967 | Hamburgen | 340/146.1 |
| 3,492,653 | 1/1970 | Fosdick | 340/172.5 |
| 4,047,154 | 9/1977 | Vitols | 340/146.3 |
| 4,132,978 | 1/1979 | Mercier | 340/146.3 |
| 4,672,678 | 6/1987 | Koezuka | 382/209 |
| 4,802,231 | 1/1989 | Davis | 382/218 |
| 4,803,734 | 2/1989 | Onishi | 382/141 |
| 5,251,268 | 10/1993 | Colley et al. | 382/227 |
| 5,257,328 | 10/1993 | Shimizi | 382/317 |
| 5,282,267 | 1/1994 | Woo | 395/157 |
| 5,526,447 | 6/1996 | Shepard | 382/311 |

Primary Examiner—Andrew W. Johns
Assistant Examiner—Monica S. Davis
Attorney, Agent, or Firm—Parmelee & Bollinger LLP

[57] ABSTRACT

Character recognition processing wherein each of a batch of documents is scanned to produce corresponding scan data signals forming a rectilinear data array of binary bits at the intersections of a rectangular coordinate grid. These signals are stored and processed by a recognition algorithm to produce identity signals for recognized characters. Groups of non-recognized characters are presented simultaneously to permit rapid identification by inspection. The identification of recognized characters is verified at high speed by simultaneously presenting the character images as respective groups sorted to have the same recognized identities. High accuracy recognition is assured by including with the stored characters to be verified a number of images of purposely-incorrectly-identified characters, i.e., bogus errors. At the end of predetermined processing segments, such as one batch of documents, the results of verification are examined to determine how many bogus errors were caught by the operator. If not all of the bogus errors present were caught, the operator may review the segment until all are caught. Statistical analysis of the data will provide assurance of high accuracy recognition.

8 Claims, 4 Drawing Sheets

FIG. 2

| 9 | 5 | 9 | 2 | V | 6 | 9 | 9 | 0 | 7 |

CHARACTERS ARE:

FIG. 3

| 9 | 5 | 9 | 2 | V | 6 | 9 | 9 | 0 | 7 |

CHARACTERS ARE:  9  5  9  2  V  6  9  9  0  7

ENHANCED BATCHED CHARACTER IMAGE PROCESSING

This application is a continuation-in-part of application Ser. No. 08/097,131 originally filed by the present inventor on Jul. 26, 1993, now U.S. Pat. No. 5,526,447.

BACKGROUND OF THE INVENTION

1. Field of the Invention

This invention relates to character recognition systems and procedures. More particularly, this invention relates to processing groups of character-bearing documents by intelligent character recognition (ICR) techniques.

2. Description of the Prior Art

Characters on documents such as forms to be filled in with hand-printed characters are now commonly read automatically by character recognition apparatus, of which there is a considerable variety. In such apparatus, the documents generally are scanned by radiant energy such as visible light or infra-red wavelengths, arranged for example to develop a series of closely-spaced parallel scan lines and to produce scan signals for closely-spaced spots along each line. The resulting scan data signals typically form a rectilinear data array of binary bits at the intersections of a rectangular coordinate grid.

These scan data signals are stored and analyzed in accordance with a recognition algorithm. Before the algorithm is applied, the character images normally are put through a "segmentation" process, to assure separation, and then are "boxed" for recognition processing. Recognition algorithms have become highly refined, so that a large proportion of the scanned characters will be correctly recognized. Nonetheless, there will be characters which the algorithm cannot recognize, or may identify incorrectly, and for most applications it becomes necessary to carry out supplementary procedures to complete the processing.

Conventionally, to determine the identity of a character which failed to be recognized algorithmically, the image of a substantial area of text or an entire field on a business form containing such character will be displayed on a CRT for inspection by an operator. This large area display enables the keying operator to be more certain of character identity than by displaying just a rejected character image, especially where segmentation may not have been performed correctly due to printing problems or other causes.

Such supplementary procedures take considerable time. For example, when fields and other large areas are displayed one at a time with isolated character rejects, an operator rarely exceeds keying one character every two seconds. A considerably greater speed of keying and correcting character identities is badly needed for high volume document processing.

In my copending application Ser. No. 08/097,131, filed Jul. 26, 1993 now U.S. Pat. No. 5,526,447, of which this application is a continuation-in part, stored character images are displayed batched in format for simultaneous inspection by the operator, for both rejected character entry and for identity verification.

In the verification process disclosed in that copending application, the individual character images from a whole batch of documents are sorted together by their identities, as determined by the ICR (intelligent character recognition) or reject entry, and displayed in arrays of the same believed identity (see FIG. 4 of that application). The operator's eye is looking only for exceptions, in an array of character images that are supposed to have the same identity, and can readily pick out the exceptions to provide a speedy identification of errors in the initial recognition results. When an error is spotted, an operator keys in a box number displayed above the previously-incorrectly-identified character and the correct character identity, and the computer, knowing in which document, field and position within field the character image came from, goes back and corrects the error in the preliminary data output.

It will be evident that the process of verification described above may be tiring on the eye of the operator, and thus this operation should be interspersed with other work. The operator may nevertheless at times be inattentive to the verification work, and advantageously a safeguard is incorporated in the procedures to allow for detection of such inattention. For that purpose, the software may provide for randomly inserting a small number of incorrectly identified character images in each batch, to gauge operator attention levels.

This can be done, as disclosed in the above-identified copending application, by deliberately inserting incorrectly-identified boxed characters, tagged in this case with null location identities. For example, the processing procedures may take every thousandth character image from the boxed image file for this purpose, display it once as identified, and deliberately change its identity code in a second display of the same character image. The characters so selected will have come from the same (statistical) character population being processed and thus will not stand out unfairly or be recognized as a bogus character by the operator if given identities of typical substitution errors. The deliberately changed-identity image boxes may for example be interspersed at every 1000th box as the sorting and concatenation into the next stage file takes place. These misidentified characters will appear in totally different and essentially random locations from the operator's point of view in the verification operation to follow because of the changed identities.

When the preliminary output text file ultimately is updated by the corrections from the verification process, the inserted character images with bogus identities and null location tags will not be inserted back into the preliminary output text file. Instead, the character identities will be checked to see if the error was corrected, and the results of such checking will be used to develop verification accuracy statistics for operator and/or supervisor review.

SUMMARY OF THE INVENTION

In accordance with a preferred embodiment of the present invention, to be described below in detail, an accuracy breakthrough is achieved by a sight verification method which allows the supervisors (management) of an ICR/OCR system to set the accuracy it wishes to achieve, and be confident it is achieving that accuracy through log records provided by the software. An accuracy specification of 99.98 percent on a per character basis is not an unreasonable accuracy to specify.

In this new technique, as in the above-identified copending application, the individual character images of fields to be verified from a batch of documents are sorted together by their identities, as preliminarily determined for example by the ICR or reject entry, and displayed in corresponding arrays. The specified accuracy is achieved by inserting deliberately misidentified character images, also as described in the copending application, and then informing the operator at predetermined intervals of the accuracy chieved in finding the inserted errors during the immediately preceding segment (i.e., since the last time the accuacy results were provided). If not all, or some authorized ower percentage, of errors have been detected, the operator hen reviews the preceding segment to detect more errors, nd this is repeated until sufficient bogus errors are found, or limit on number of reviews set by management is reached. A supervisor would normally be called if such a limit is eached and processing by a different operator might be uggested.)

The error rate on detecting real errors is directly related tatistically to the error rate on false errors provided the false rrors are statistically indistinguishable from real errors. A ypical false error insertion rate is one for every ten expected eal errors, and use of that ratio normally results in at least 99.95 percent accuracy rate, assuming that the starting ubstitution rate is two percent or less and that the operator lways reviews the last segment when all false errors have ıot been detected. By inserting more false errors, 99.98 ercent accuracy or higher can be achieved.

Accordingly, it is an object of this invention to provide a ırocedure for achieving assured high accuracy recognition ıf scanned characters. Other objects, aspects and advantages ıf the invention will in part be pointed out in, and in part pparent from, the following detailed description considered ogether with the accompanying drawings.

BRIEF DESCRIPTION OF THE DRAWINGS

FIG. 2 shows an example of a CRT image display at the tart of operator processing of a batch of rejected characters;

FIG. 3 is like FIG. 2, but shows the identified characters .s entered by the operator;

FIG. 4 shows an example of a CRT image display of a ;roup of sorted same-character images during verification ırocessing by an operator;

FIG. 5 shows a CRT display presenting portions of two ;roups of sorted characters; and FIG. 6 shows a single character from FIG. 4, with an ıperator-entered correction.

DESCRIPTION OF A PREFERRED EMBODIMENT

Referring first to FIG. 1, at the upper left-hand corner is ;hown a batch of documents 10 such as business forms which are to be scanned as part of the process for machine ecognition of characters on the documents. To the right of he documents is illustrated in general outline a scanner 12 which may, for example, be similar to that shown in U.S. ?at. No. 4,760,246 issued to D. H. Shepard on Jul. 26, 1988. That scanner employs a linear array sensor to detect the ımount of radiation reflected from closely-spaced spots ılong a scan line across a document in the scanner. As the locument is advanced through the scanner, the sensor develıps such scan data signals for a series of closely-spaced scan ines, e.g. about 0.008" apart. These signals are read out ;equentially by conventional electronic means and stored.

Associated with the scanner 12 is a data processor, as ;enerally indicated at 20, preferably a conventional PC ıaving the usual data entry keyboard for an operator. This ?C has substantial memory capacity, and includes software :outines which establish files and order the processing of the data as will be described. At the start, the operator keys in a batch number to identify the group of documents to be processed. The scan data signals from the documents may initially be compressed to reduce storage requirements, and then are stored in a memory file referred to in FIG. 1 as the SWF File.

Figure 1A:
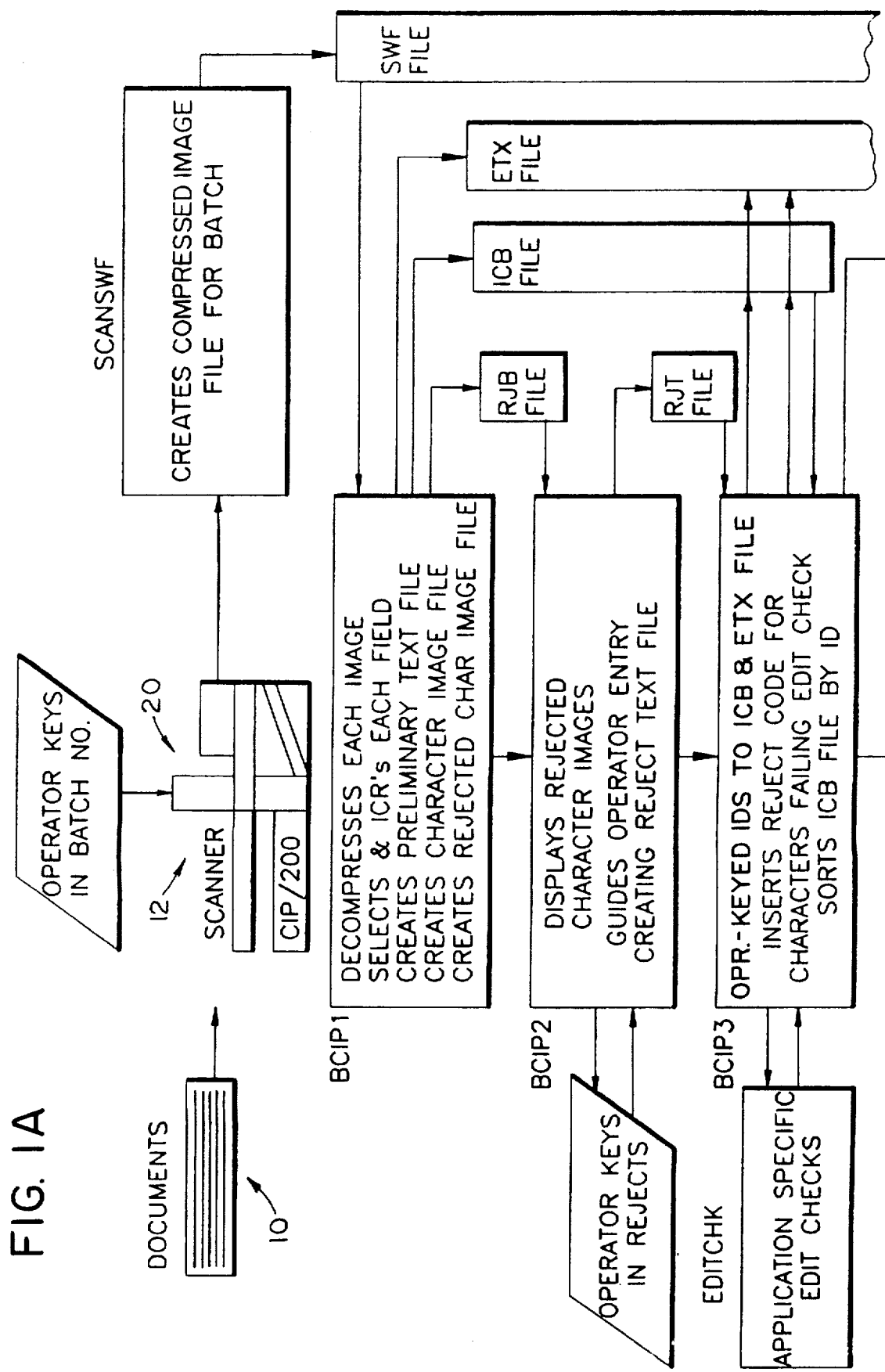
FIGS. 1A and 1B together form a flow diagram showing ıperations involved in analyzing the character scan data to letermine the identity of algorithmically unrecognized char.cters and to verify the accuracy of recognized characters.
Figure 1B:
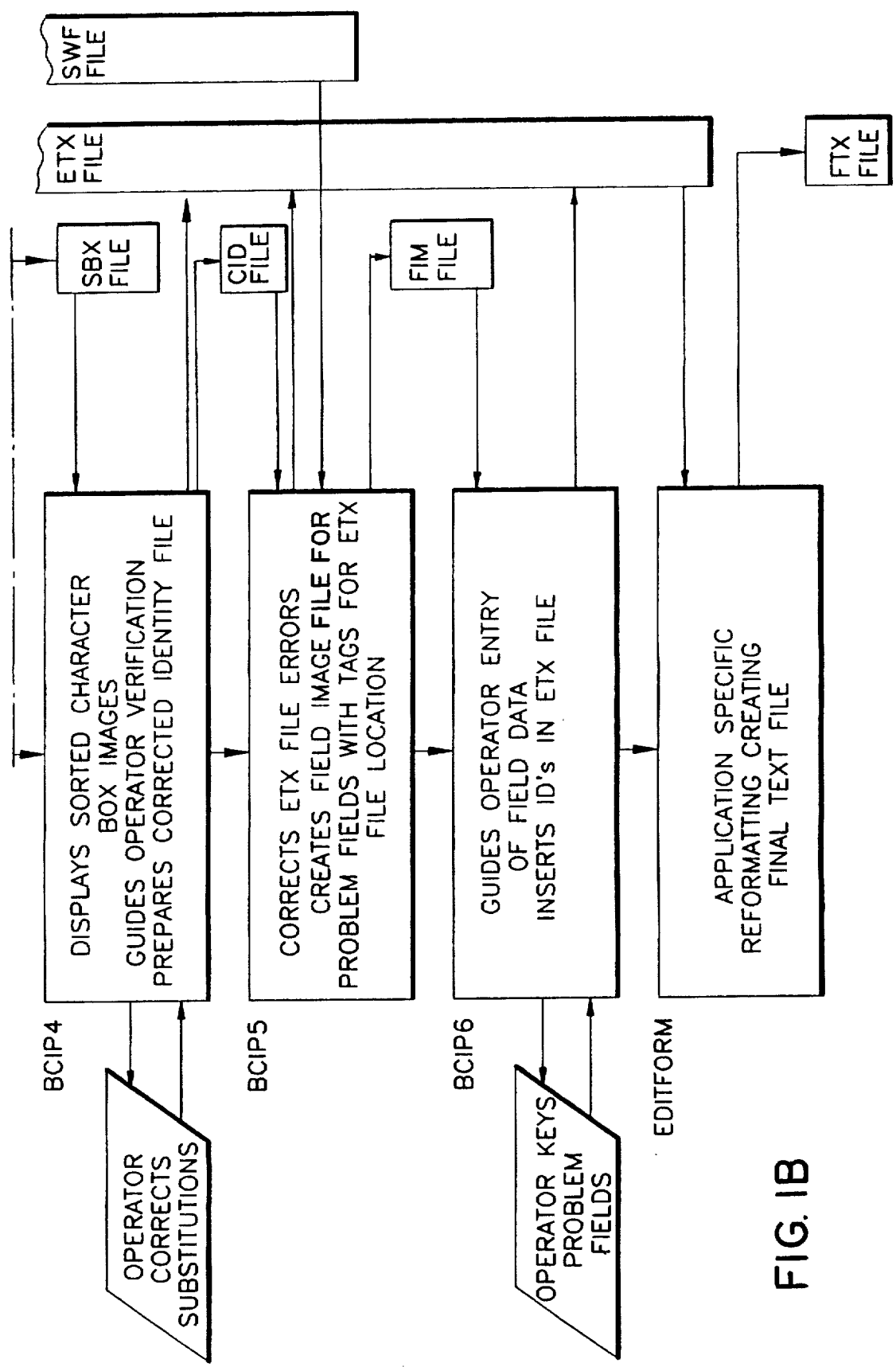

FIGS. 1A and 1B outline the processing procedures by means of a series of function blocks BCIP1, 2, etc. (where BCIP stands for Batched Character Image Processing). These blocks contain descriptive statements explaining the actions performed during the corresponding segment of the program. The sequence of action proceeds downwards through the series of blocks. The files established in the PC memory are identified to the right of the BCIP blocks, and operator actions and other procedures are described to the left of the blocks.

Scanning of the documents 10 by the scanner 12 can be carried out while the operator is working on the processing of the scan data from a previously-scanned batch of documents using a second PC networked to the PC controlling the scanner. A typical scanner used in image storage and character recognition work may scan and store document images at the rate of about one document per second. Character recognition of complete document images also may typically proceed at the rate of about one document per second, although this will vary with document content and recognition algorithms used.

In a presently preferred embodiment of this invention, a few hundred documents are processed at a time, with the scan data signals for the entire batch being stored in a single file. Storing this much data permits an operator to start a batch of documents into the scanner and then do the reject character entry and/or character verification (to be described) for a previous batch file (SWF File) while the new batch of documents is being scanned. The overall SWF File includes a number of separate files, which can be individually identified such as 0001.SWF, 0002.SWF, etc., to accommodate respective batches of documents.

Turning now to the processing of the scan data signals in the selected SWF File, each document image in that file is accessed and decompressed back to its original format, as indicated in the block at BCIP1. The particular character fields to be processed are predetermined in the usual way, and the characters in that field or fields are "boxed", i.e., the character images are isolated and stored within particular locations in memory. In the preferred process, these boxes are arranged as successive rows of side-by-side images, with each character image being placed in the upper left-hand corner of its box. The document processing preferably is carried out left-to-right, top-to-bottom, although other protocols can be used.

The appropriate recognition algorithm then is applied to each stored character image. A large proportion of the boxed characters will be recognized algorithmically, and codes for those characters are then stored in a Preliminary Output Text File (ETX) for each document. Assuming that a certain number of characters is specified for each field in the output record, as is usually true in form data entry applications, the output record (ETX file) is stored from the start in this format, even if the number of characters seen in the field is less. For example, if the field specified is for the name of the person filling in the form, the number of character slots must be large enough for the longest name expected. For shorter names, space characters are inserted to fill the blanks.

The boxed character images are stored in a file labelled ICB ("identified character boxes"). In the preferred embodiment, each boxed character image is assigned 96 bytes of data, each of 8 bits. The image pixels for the CRT are in the first 93 bytes which define a rectangular array 24 pixels wide and 31 pixels deep for the CRT presentation. Byte 96 carries the character identity, if recognized, and a reject code if it fails recognition to a specified confidence level.

Rejected boxed character images are stored in a file labelled RJB ("rejected box"). As each image is stored, in both the ICB and the RJB files, its box is tagged with the document number (bytes 90, 91) and the character number in the document (bytes 92, 93). (Note: Bytes 90–93 are in the lower right-hand corner of the box, and are almost never useful to the human eye in determining character identity since in the preferred boxing process the characters are shifted as far as possible to the upper left-hand corner in the boxing algorithm used. These pixels, not overwritten at the time of application of the recognition algorithm, need not be displayed for operator use.)

When the RJB file has been completed, the stored images are displayed in batch format on the PC CRT screen as indicated in BCIP2. These characters normally will be grouped together in a constant convenient number, such as ten. An example of such a display is presented in FIG. 2. (Note: If some fields are known to be numeric and others alphabetic, it is generally preferable to produce two separate files for such different types of characters, in order to eliminate confusion, such as between the digit zero and the letter "O".)

The operator examines this display as illustrated in FIG. 2 and, by inspection, determines the identity of each rejected character to the extent possible. These identities then are keyed in by the operator. If the operator cannot identify the character from the image as boxed, the operator keys in a code meaning "I don't know" instead of the identity. The identified characters or "I don't know" code are displayed immediately below the original character image as each is keyed in, as illustrated in FIG. 3. The operator thus can review the assigned identity as it is entered, so as to spot a possible keying error. The operator has another chance for such review at the end of the line before pressing the "enter" button. After this process is completed, the keyed-in operator-determined identities are concatenated in a file labelled RJT ("rejected text").

In BCIP3, the operator-determined identities of the rejected characters are inserted into byte 96 of the corresponding boxed characters in the ICB file for later use in the verification stage. These corrected identities also are collated back from the RJT file into the ETX file for the corresponding characters. The corrected identities are inserted one at a time as the reject codes are encountered in the ETX file.

This latter updating of the ETX file need not make use of the box tag data to determine the insertion point. That is, each ETX text character to be corrected is identifiable by the reject code in place of an identity code. Thus, as each reject code is encountered it is replaced by the next available newly-identified character identity code (or an "I don't know" code) from the RJT file, due to the 1:1 correspondence between the RJT file information and the reject codes in the ETX file.

Application-specific edit checks may be applied to reduce uncertainties. This is shown at the left of BCIP3, but can also be done in other BCIP stages such as BCIP2 before reject character display, so as to reduce reject keying. For example, a data base may be available, such as Zip Code information which can be used to aid in recognition of names in addresses. To illustrate, CORONADO, Calif. has the Zip Code of 92118. If the recognized Zip Code is 92118, and if the recognized city name has eight letters, many of which match the letters of CORONADO, not much chance is taken by filling in the uncertainties or even replacing one or two mismatched characters. When done in BCIP3, rejected characters in "CORONADO", if any, are not displayed in BCIP2 because it is known in BCIP1 that the "city" field is associated with the Zip Code field. In the unusual case of an error after data base match, it will be detected later. Or, if no good match is found, the "I don't know" character may automatically be inserted in the ETX file, resulting in later display of the whole field for keying.

Also in BCIP3, the tagged character images in the ICB file (as corrected by the rejected character sequence described above) are sorted by character identity so as to group together characters having a common identity characterization. Specifically, all numeric zeros are collected together, followed by all numeric ones, and so on. Similarly, all alphabetic "a"s are collected together, followed by all "b"s, and so on. Within each group of common identity characterization, the originally rejected and later key-identified images appear first, followed by the originally recognized characters. These groups of characters are concatenated and placed in a file labeled SBX ("sorted box file"), and in BCIP4 are displayed in group format for examination by the operator. This is illustrated in FIG. 4 for the case of numeric zeros.

Figure 4:
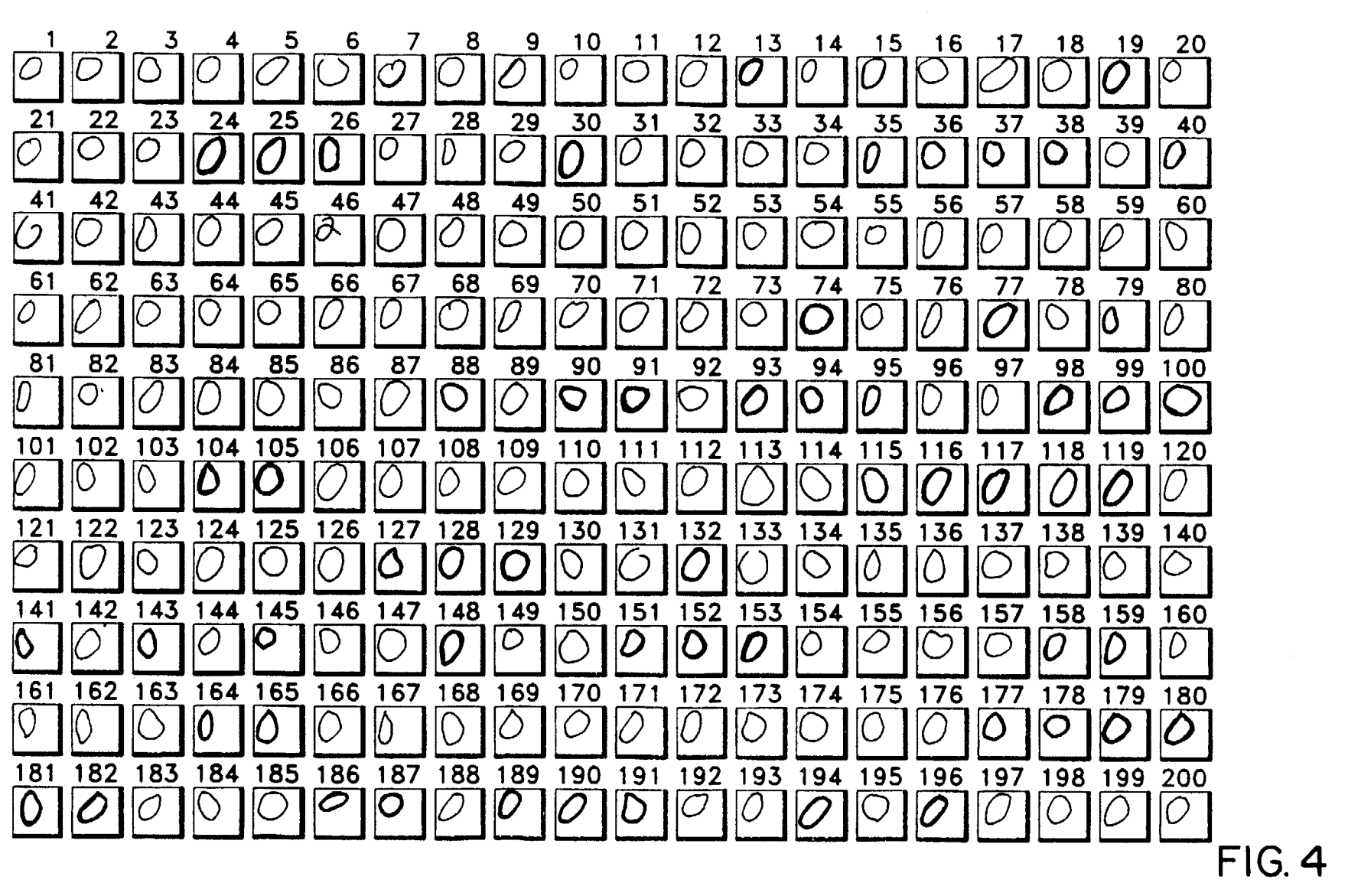

As shown in FIG. 4, it is convenient to present a two-hundred character display on a single screen (e.g., 20 across by 10 down) if the number of characters in the group warrants. The commonly-identified characters are taken from any place on any of the documents, and although presented side-by-side, as shown in FIG. 4, will in almost all cases not be from such adjacent locations on a document. FIG. 5 illustrates the condition where the last line of one group may not fill up one complete line. In that case, the remainder of the last line of that group will be filled with spaces (as shown, from box 31 on), and the next group will be started at the beginning of the next line (box 41), to avoid confusion between groups.

The operator can quickly scan a display such as shown in FIG. 4, and can readily spot any character which should not be a member of the group. For example, the verification display for box number 46 in FIG. 4 is illustrated as an imperfect "2". The image shown will be recognized by the operator as a "2", even though incorrectly recognized as a "0" by the algorithm. The operator then will enter through the PC keyboard the screen location number shown with the problem box (No. 46), together with the corrected identity "2".

As shown in FIG. 6, this corrected character then will automatically be presented in the lower right-hand corner of the box, preferably in a different color such as red. If the operator is not sure of the correct identity, the code for "I don't know" will be entered.

The new information entered is placed in the tag for the image box (ICB file) of the corrected character. That is, the new character identity (or the "I don't know" code) will be inserted in byte 96, and such complete 5-byte tags (two for document number, two for character number and one for identity) then are concatenated in a file labelled CID, standing for "corrected identity".

The ETX file now is updated in BCIP5, to correct any errors found in the verification process. For this, the 5-byte gs in the CID file are used to determine the document number and character number within a document to locate the correction points, and the corrected identity code is inserted there in the text. It may be noted that since the verification operation follows the reject entry operation, inadvertent reject keying errors made by the operator will be caught in the verification stage.

As noted above, sometimes characters cannot be determined by the operator, either in the reject entry stage or the verification stage. In that case, the operator will have keyed in the "I don't know" code for byte 96, to be inserted in the TX file. The image in the SWF file of the document containing such a character is reprocessed in order that the operator may make a decision based on the appearance of each such "I don't know" character in the context of its field. This reprocessing may include re-keying the entire field, for example if the problem arose due to faulty segmentation.

In this BCIP5 reprocessing, the field images (i.e., the scan data for all the characters in the particular field containing the unrecognized character) are extracted from the whole document image using the same algorithm by which the fields were originally isolated for processing, saving the field images in an FIM file ("field image file") whenever the secondary text file (ETX) derived as described above contains the "I don't know" identity code for a character in that field. No character recognition is performed in this pass, and documents which contain no "I don't know" characters are passed over entirely. A tag is attached to the extracted field image in the FIM file indicating what document number in the batch and what starting number within the document applies to that field, as well as carrying along the text currently in the ETX file for that field.

The last operator step, BCIP6, is to review any rejected field images one at a time from the stored displays in the FIM file, to provide corrected identities in the ETX file for the originally unrecognized characters. After the operator keys in the correction, the computer inserts the corrected field text back into the document number and field starting position in the output record (ETX) indicated by the tag attached to the field image.

In some applications, a document occasionally is in such bad condition that a field on a document appears so far from where expected that some of the data is not entirely within the field image saved. (This can happen, for example, on a torn document which, nevertheless, made it through the scanner.) In this case the entire document image or some other portion larger than a field may be displayed in the BCIP6 operation when the operator encounters this problem, returning to the next stored problem field after resolution of the problem which required further field expansion.

The final version of the ETX file can, where appropriate, become the final text file (FTX) representing the output of the recognition process. However, in some applications it may be necessary first to reformat the output text into a specific order different from the top-to-bottom, left-to-right order in which documents are normally scanned, or reformatting for some other purpose such as abbreviation expansion may be required.

It will be evident that the process of verification described above may be tiring on the eye of the operator, and thus this operation should be interspersed with other work. The operator may nevertheless at times be inattentive to the verification work, and advantageously a safeguard is incorporated in the procedures to allow for detection of such inattention. For that purpose, the software may provide for randomly inserting a small number of incorrectly identified character images in each batch, to gauge operator attention levels.

This can be done, as described in the above-identified copending application, by deliberately inserting incorrectly-identified boxed characters, tagged in this case with null location identities. For example, the processing procedures may insert after every thousandth character a bogus error from a library built up of real previously-incorrectly-identified character images. Such false errors cannot possibly stand out as bogus as long as the library is fairly large and care is taken to keep it typical of current data. These misidentified characters will appear in totally different and essentially random locations from the operator's point of view in the verification operation to follow because of the changed identities.

When the ETX file ultimately is updated by the corrections from the verification process, the inserted character images with bogus identities and null location tags will not be inserted back into the ETX. Instead, the character identities will be checked to see if the error was corrected, and the results of such checking will be used to develop verification accuracy statistics for operator and/or supervisor review.

In the above-identified copending application, it was mentioned as an example that one bogus error might be inserted for every thousandth scanned character image and that the success rate of an operator in finding the deliberate errors could be reported to the operator and management. By reporting to the operator her/his performance in catching bogus errors at the end of predetermined intervals, such as after the processing of each batch of documents, and permitting the operator to review the displays to detect more bogus errors if not all have been found, maintenance of an error rate specified by management on real character image identifications may be assured. This assurance, of course, is only statistical, and requires that bogus character image errors are truly representative of real character image errors in that batch and not spotted either more or less easily. The main tool, however, is to insert enough bogus errors to assure that the required accuracy rate is achieved on a sustained basis. This procedure has become known as "Sorted Character Image Verification" (SCIV).

At the end of each set of arrays, corresponding perhaps to a batch of documents, the operator's performance is displayed, for example, as "Nine out of the ten bogus errors were found. Review or Proceed?" While management policy may occasionally permit proceeding in this situation, the operator will generally elect to review if not all bogus errors have been found.

As shown in FIG. 6, when an operator makes a correction of an error, the corrected identity is displayed in the lower right hand corner of the character image determined to have been mis-identified. When an operator reviews a set of arrays already inspected, these corrected identities are displayed again in the corrected boxes, which avoids correcting the same problem twice. In review, the operator may make additional corrections in the same manner as before. When satisfied, the operator may terminate the review and have the new state of success displayed.

A number of factors enter into calculating what the rate of bogus error insertion should be. In general, the higher the desired completed accuracy and the greater the starting error rate, the more bogus errors should be inserted. Factors usually of less importance, but which cannot be ignored, include any statistical deficiency with which the bogus errors are truly representative of real errors and the number of times an operator is permitted to review the array displays of a batch, both of which, if significant, require a further increase of the bogus error insertion rate. And the statistical variance expected when a small sample is used to estimate a parameter of a larger sample must also be considered.

The reason the number of times the operator has reviewed a batch is a factor may be seen by pointing out an extreme case. If only one bogus error was inserted per batch, and if an operator quit looking half way through each batch and went on to look for more errors only if told all bogus errors had not been found, clearly many real errors would be missed even though the reported bogus error rate for the operator was one hundred percent. However, inserting more bogus errors discourages this operator approach.

As a practical matter, however, an operator who makes repeated reviews also takes longer, as does an operator who looks at each character image in sequence in spite of the array display. The best operators usually find all the bogus errors on the first inspection, but do occasionally miss one in a batch and then catch it in review.

While it may be desirable to treat all the factors above in calculating the best bogus error insertion rate with mathematical precision in some large applications, management is likely to gain confidence more rapidly by running empirical tests based on prudent guesses. It is not difficult to run such empirical tests in actual applications by specifying a bogus character insertion rate for the BCIP3 stage, which may be initialized as a constant, and recording operator rates on both bogus and real error rates when processing carefully pre-verified material.

Specifying this rate at one bogus error for each ten expected real errors appears to be a practical rule of thumb. However, the bogus error insertion rate should also be high enough to insure that the operator encounters not less than about five bogus errors per batch to assure constant attention, which may vary during the day. (Here a batch is assumed to have between one and ten thousand character images to be verified, a range which is probably best to maintain from a human attentiveness viewpoint.) For this reason, if management specifies very high accuracy rates and the starting accuracy is already quite high, it may be necessary to insert even more bogus errors than the expected rate of real errors.

The results of one series of such tests on hand printed numbers extracted from a live application indicated that with a two percent real error substitution rate existing in the starting arrays and one bogus error inserted every 500th character, that a 99.98 percent accuracy on a per character basis in the output was maintained. The test was arranged to have exactly ten bogus errors per batch of 5000 character images and the two operators involved, who maintained good speed, together averaged having to review about one batch in five. However, it is more conservative to assume that only a 99.95 percent accuracy will be achieved at this bogus error insertion rate. It may seem that if an ICR algorithm or combined set of algorithms is averaging a two percent substitution error rate in a given application without verification and an operator is missing two percent of these errors in performing verification, that the resultant error rate will be 0.04 percent, or an accuracy of 99.96 percent. Even if an operator is missing no bogus errors, since the number of inserted bogus errors is usually small in comparison to the expected number of real errors, it is quite likely she/he is in fact missing some real errors, and being human, this may vary. The result is that empirical tests should be run under real application conditions to gain confidence on the number of false errors to insert to obtain a given accuracy if approximate figures are not close enough.

Achieving an accuracy of 99.95 percent or higher on a per character basis may seem to be a high specification, but in an application that has 50 characters per document requiring verification, one document in forty will still have an error. The consequences of one error per forty documents may still be too costly for some applications, in which case still more bogus errors should be inserted.

In the above-mentioned copending application an array size of ten by twenty character images was described. Tests run subsequently have shown that an array size of ten by ten is usually more efficient. There are two reasons for this. First, and most important, is that if an array is too big, operators are more tempted to look at character images in sequence, and thus lose speed, because there is too much for the eye to contemplate all at once. Secondly, when a correction is made, a maximum of three keystrokes are required to change the identity instead of four, since only two keystrokes are required to input the box number.

Even smaller arrays have been tried, but of course the number of new screens required to process the same batch increases and has an offsetting negative effect on speed. However, the type of character images being displayed also has a bearing on this. For example, a large array of typed zeroes can be inspected as easily as a small array of a mixture of hand printed twos with and without loops. But for the sake of uniformity, ten by ten appears quite practical.

Verification of handprinted characters is a very important use of SCIV. But if characters run together in the hand printing and the ICR has not been successful in "segmenting" the characters into images of complete isolated characters, an operator will properly think "I don't know" and so indicate by keying a code which brings up the whole field at a later time, as described in my above-identified copending application.

Other "I don't know" situations also exist. When such situations do exist, corrections are made at another stage and time is lost. The effect of these situations must be measured. But in the processing of data entered on preprinted forms, these situations can be minimized by careful form design.

It should be noted, however, that from the start only half the number of characters are inspected in the array method as are in sight verification methods where the tentative identity determinations are displayed in a standard font right under the text image. This is because the only display of the tentative identity in the array method is for a whole block of data.

Furthermore, the human eye is amazingly good at spotting exceptions in a field of images all of which are supposed to be alike. The result is that spotting of errors in the array method can be as much as ten times as fast as other methods. However, when correcting the error, including "I don't know" situations, as well as spotting the error are taken into account, a factor of three speed improvement is likely to be more typical of hand print applications, with higher factors possible with machine print.

Although a preferred embodiment of the invention has been disclosed herein in detail, it is to be understood that this is for the purpose of illustrating the invention, and should not be construed as necessarily limiting the scope of the invention since it is apparent that many changes can be made by those skilled in the art while still practicing the invention claimed herein.

What is claimed is:

1. In a process for verifying the tentatively determined identity of recognition-processed characters, the steps of:

storing data representing the images of a number of characters which have been tentatively identified in a predetermined computer-controlled algorithm providing a recognition-processing segment;

storing data representing the images of a number of characters which are purposely-incorrectly-identified (PII);

sorting said stored tentatively-identified and PII image data into groups of characters of the same identification;

merging by combining the tentatively-identified characters of one group with a number of said PII characters from a corresponding group having the same (but incorrect) identification as said one group;

simultaneously displaying in a single uniform composite array a number of stored character images from each of said groups of the same identification;

determining by inspection the presence of characters in the displayed groups failing to have the characterization common to those groups of the same identification;

determining those characters failing to have said common characterization which were purposely-incorrectly-identified (PII);

developing statistics reflecting the number of PII characters found in said inspection;

determining from said PII statistics whether a desired sufficient number of incorrectly-tentatively-identified characters has been found; and when an insufficient number of such characters has been found, inspecting said displayed groups again in an effort to find additional characters failing to have the characterization common to those groups.

2. The method of claim 1, wherein the operator is at intervals informed of the number of PII characters that were inserted.

3. The method of claim 1, wherein the operator is at intervals informed of the number of PII characters corrected since the last report to the operator.

4. The method of claim 1, including the step of utilizing said statistics to specify the probable accuracy to be achieved in verifying data.

5. The method of claim 1, including the stop of predetermining the probable accuracy with expectation of achievement by setting the rate of PII character insertion.

6. The method of claim 1, wherein the groups of characters to be verified are displayed in arrays of approximately ten by ten character images.

7. The method of claim 1, wherein the groups of characters to be verified are displayed in two-dimensional arrays of no more than ten character images in either dimension.

8. The method of claim 1, including the steps of:
establishing a desired completed accuracy rate for the recognition process;

calculating the rate of PII character insertion required to effect said established completed accuracy rate; and merging the calculated number of PII characters with a group of sorted and tentatively identified characters to effect said desired accuracy rate.

* * * * *